United States Patent [19]

Beckwith et al.

[11] Patent Number: 4,600,547
[45] Date of Patent: Jul. 15, 1986

[54] METHOD OF PREPARING POWDER INGREDIENTS BY DRY MILLING FOR SUBSEQUENT CONSOLIDATION

[75] Inventors: Elaine C. Beckwith, Riverview; Andre Ezis, Grosse Ile, both of Mich.

[73] Assignee: Ford Motor Company, Dearborn, Mich.

[21] Appl. No.: 630,179

[22] Filed: Jul. 12, 1984

Related U.S. Application Data

[63] Continuation-in-part of Ser. No. 444,253, Sep. 30, 1982, abandoned.

[51] Int. Cl.$^4$ ................................................ B28B 1/00
[52] U.S. Cl. ........................................ 264/63; 241/15; 241/22; 252/56 R; 264/109
[58] Field of Search ............... 264/65, 63, 56, 109; 252/56 R; 501/96; 524/80, 413, 430, 560; 106/286.3, 286.2, 286.4; 241/15, 22

[56] References Cited

U.S. PATENT DOCUMENTS

| | | | |
|---|---|---|---|
| B 346,044 | 1/1975 | Smith et al. | 264/63 |
| 2,434,273 | 1/1948 | Howatt | 264/63 |
| 2,486,493 | 11/1949 | Revukas | 252/56 R |
| 3,602,986 | 9/1971 | Conwicke | 264/63 |
| 3,819,786 | 6/1974 | May | 264/63 |
| 4,184,884 | 1/1980 | Jong | 264/63 |
| 4,209,477 | 6/1980 | Yanagida et al. | 264/63 |
| 4,221,596 | 9/1980 | Rice | 264/63 |
| 4,243,621 | 1/1981 | Morc et al. | 264/65 |
| 4,346,147 | 8/1982 | Barlier et al. | 264/65 |
| 4,351,787 | 9/1982 | Mortinengo et al. | 264/65 |
| 4,354,990 | 10/1982 | Mortinengo et al. | 264/65 |

FOREIGN PATENT DOCUMENTS

| | | | |
|---|---|---|---|
| 1949587 | 8/1970 | Fed. Rep. of Germany | |
| 966945 | 8/1964 | United Kingdom | 264/63 |
| 1274211 | 5/1972 | United Kingdom | 264/63 |

OTHER PUBLICATIONS

Milby, Plastics Technology, McGraw–Hill, N.Y. (1974), pp. 299, 301–306.
Jour. American Ceramic Society, vol. 62, No. 11, Effect of Carbon Impurity on Thermal Degradation $Si_3N_4$—$Y_2O_3$.

Primary Examiner—Willard E. Hoag
Attorney, Agent, or Firm—Joseph W. Malleck; Roger L. May

[57] ABSTRACT

A method of making a compacted body useful in the fabrication of an improved, fully densified silicon nitride ceramic is disclosed. Silicon powder, oxygen carrying agents, and a dry lubricant (an aliphatic acrylate resin) are admixed. The lubricant is selected to have a low surface energy value less than 28 dyne/cm, have a glass transition temperature of −43° to −82° C., and a molecular weight equal to or less than 5000. The admixture is milled to a desired average particle size no greater than 35 microns. The milled mixture is then formed into a compact which can be nitrided and hot pressed to form a fully dense silicon nitride object.

7 Claims, No Drawings

METHOD OF PREPARING POWDER INGREDIENTS BY DRY MILLING FOR SUBSEQUENT CONSOLIDATION

RELATED CASES

This is a continuation-in-part application of U.S. Ser. No. 444,253, filed Sept. 30, 1982, and now abandoned.

BACKGROUND OF THE INVENTION

In the manufacture of ceramic parts using dry milling, powder ingredients are first admixed and dry milled to more uniformly mix the ingredients and to provide a better particle size and particle size distribution by comminution through the milling action. In addition, if attrition or wear from the milling media is a desired or required part of the chemistry of the powder composition, the milling action is used to create the proper chemical proportions of the mix. The dry milled powder mixture can then be directly subjected to cold compaction, gas chemical treatment, and consolidation to produce the desired product. Dry milling is advantageous, as opposed to other types of milling, because it promotes a broader particle size distribution which, in turn, provides much better packing density for improved hot pressing. However, if the dry milling is not complete, that is, if the powder ingredients are not reduced to a desired maximum particle size and desired homogeneity, then incomplete or unreacted ingredients may result from subsequent gas chemical treatment, resulting in a hot pressed product with flaws and hot pressed products with variable physical properties.

In the case of the manufacture of a silicon nitride cutting tool material, flaws are associated with inconsistent dry milling techniques and are attributed to homogeneity differences and to subsequent processing treatments. Incomplete dry milling often is the result of caking of the powder mixture along the sides of the milld due to the hygroscopic nature of silicon. The resulting homogeneity differences include a variable surface area mixture which limits effective oxygen control and concentration gradients of the ingredients which causes strength variation in the final hot pressed product. In addition, processing flaws also originate from unreacted silicon after nitrogen gas treatment of silicon powder. The free silicon is due to large particles that are not fully nitrided. Free silicon eventually combines with impurities in the silicon powder either during nitriding or during hot pressing to generate a silicide, such as iron silicide. The silicide forms a liquid which dissolves silicon nitride during hot pressing and, when cooled, crystallization results in large beta $Si_3N_4$ particles adjacent the silicide along with porosity. These are defects in the ceramic which may pull out or degrade mechanically or chemically during use of the ceramic, particularly as a cutting tool.

Heretofore, prior art methods have incorporated wet milling aids in a high amount of 5% or more by weight, such as stearic acid, zinc stearate, oleic acid, and carbowax, each of which have a high residual carbon content in the final product which can cause contamination. The importance of carbon control and the effects of carbon on hot pressed silicon nitride is described in the article by H. Knoch and G. E. Gazza, "Effect of Carbon Impurity on the Thermal Degradation of an $Si_3N_4$—$Y_2O_3$ Ceramic", *Journal of The American Ceramic Society*, 62 (11–12) 634–635 (1979). Although wet particle milling appears to avoid the caking problem associated with dry milling, such wet milling undesirably provides carbon contamination of the mixture because of the necessity for large amounts of liquid resins (containing carbon) to facilitate the wet milling (see British Pat. No. 966945). Moreover, wet milling inherently provides too steep a particle distribution for good packing density and thus eliminates one of the significant advantages of dry milling. Wet milling must be distinguished from processes where liquid resins are added to the powder mixture to provide for molding of the mixture into a body which is then nitrided and sintered (for the latter, see U.S. Pat. Nos. 4,209,477; 4,346,147; 4,351,787; 4,354,990; 4,243,621; 4,221,596; and German Pat. No. 1,949,587). Any inherent lubricating quality of such liquid resins is, of course, unemployed in such prior art usage.

What is needed is a method for dry milling the starting powder ingredients consistently to ensure that the particles of the milled dry mixture are not above a critical particle size, such as 35 microns. This requires preventing the packing of the mixture along the sides of the milling chamber and thus ensuring a constant milling action. Such method should not incorporate additive materials that will provide for undesirable side reactions, such as carbon contamination. Additiionally, such method should optimally reduce the milling time, should improve the green strength of the milled mixture when compacted, and should minimize, if not totally eliminate, flaws associated with unmilled powder in the final ceramic product. It should also provide for a reproducible milling action from batch to batch, i.e., reproducible homogeneity.

SUMMARY OF THE INVENTION

The invention is a method of making a compacted body useful in the fabrication of an improved, fully densified, silicon nitride ceramic product which has particular utility as a cutting tool. The method comprises mixing a supply of silicon powder and a supply of oxygen carrying agents with an effective but small amount of a dry lubricant of the type having a low surface energy value less than 28 dyne/cm, and further characterized by a glass transition temperature of $-43°$ to $-82°$ C. and a molecular weight of 5000 or less. The admixture is then dry milled for a sufficient period of time to ensure that the maximum particle size of the mixture is no greater than 35 microns. Finally, the milled mixture is dry formed into a compact with pressure producing sufficient green strength for handling.

It is preferable that the dry lubricant be selected from the group consisting of polybutylacrylate, poly 2-ethylhexylacrylate, and polyisobutylacrylate. The dry lubricant may be further characterized by its ability to render lubrication even though added in an extremely small amount, thus avoiding carbon contamination. The lubricant is effective to avoid packing of the powder mixture along the sides of the milling chamber during the milling operation, thereby permitting said milling to reduce the particles to a consistent desired maximum size of no greater than 35 microns within a milling period equal to or less than 48 hours. It is advantageous to add the dry lubricant in an amount of 0.001–0.006% by weight of the mixture or about 0.001 gram per 100 grams of mixture.

It is preferable if the starting materials have defined purities. For example, silicon powder may have a purity of 97% or greater with carbon equivalent no greater than 0.05%, and the oxygen carrying powder agents may have a purity such as 99.99% for $Y_2O_3$ and 99.5% for $Al_2O_3$. The starting silicon powder can have an average particle size greater than 10 microns, and operably the starting average particle size can be as high as 60 microns.

Optimally, the starting powder ingredients may comprise silicon powder, $Y_2O_3$, and $Al_2O_3$ with the purity of $Y_2O_3$ being at least 99.99% and the purity for $Al_2O_3$ being at least 99.5%.

DETAILED DESCRIPTION

A preferred method for making a compacted body useful in the fabrication of an improved, fully densified silicon nitride ceramic product according to this invention is as follows.

1. Mixing

An admixture of powder ingredients comprising silicon powder, reactive oxygen carrying powder agents, and a dry milling lubricant is prepared. The reactive oxygen carrying powder agents is defined herein to mean powder ingredients that are effective to form second phase crystallites, particularly oxynitrides and/or certain silicates, when reacted with the powder mix under a heated nitrogen atmosphere. The oxygen carrying agents can be advantageously selected from the group consisting of $SiO_2$, $Y_2O_3$, $Al_2O_3$, $CeO_2$, $ZrO_2$, $HfO_2$, and other rare earths. Use of these agents will improve physical characteristics and formation of a second phase crystallite which will be unformly disbursed and which substantially displaces a detrimental glassy silicate phase normally formed except for a controlled and limited amount of the latter.

For purposes of the preferred method, a uniform powder mixture is typically prepared with 2000 grams of silicon (86.6 weight percent of mixture), 278 grams of $Y_2O_3$ (12 weight percent of mixture and 13.9% of silicon), and 32 grams $Al_2O_3$ (1.4 weight percent of mixture and 1.6% of silicon). The usable range for the oxygen carrying agent is 0.4–2.3 molar percent of the mixture and 0.4–2.4 molar percent of silicon. $Y_2O_3$ is normally used in the range of 3–19% by weight of the silicon and 3–16% by weight of the mixture. $Al_2O_3$ is used in the range of 0.4–5% by weight of the silicon, 0.4–4% by weight of the mixture. $SiO_2$ is present usually as an oxide on the silicon powder and increases to 1–3% by weight of the silicon by milling.

Silicon is preferably selected to have 98% pr greater purity and a starting average particle size of about 10–20 microns with random particles in the 100–540 micron range. The major trace metal contaminants experienced with such purity include: iron up to 1.0%, aluminum up to 0.5%, and manganese up to 0.09%. Nonmetallic contaminants include: carbon up to 0.05%, and oxygen less than 0.5%. The average crystallite size of the $Y_2O_3$ powder is about 0.04 microns (400 Å) with random crystallite agglomerates as large as 40 microns. The average particle size of the $Al_2O_3$ powder is 0.3–0.5 microns with random particles as large as 50 microns.

To the above ingredients is added a dry milling lubricant which must have a low surface energy value less than 28 dyne/cm, a glass transition temperature in the range of $-43°$ C. to $-82°$ C., and is further characterized by a molecular weight equal to or less than 5000. The limitation of surface energy or tension is critical in order to have the lubricant wet the granular material. Too high a surface tension will have the grains partially or wholly unwetted. The transition temperature is critical because a viscous liquid lubricant is desired, not one that is glassy or becomes more like a solid under milling due to a high transition temperature. The molecular weight can be designed or manipulated by the chemist, but must not be in excess of 5000 so as not to be too viscous and insufficiently liquid.

The dry milling lubricant is preferably selected from the group consisting of polybutylacrylate, poly 2-ethyhexylacrylate, and polyisobutylacrylate. The dry milling lubricant is added in an effective small amount to ensure that the powder mass will not collect and pack along the sides of the milling chamber during the milling operation, thereby permitting the milling to consistently reduce all particles to the desired size of no greater than 35 microns within a milling period equal to or less than 48 hours. An effective small amount is in the range of 0.001–0.006% by weight of the mixture; this amount is insufficient to cause a problem through carbon contamination.

2. Milling

The mixture is then comminuted and blended by being charged into an inert milling jar along with grinding media in the form of hot pressed silicon nitride cylinders of desired end product composition and is milled for 48 hours at 64 rpm. The milling is considered dry because no liquids are added, except that the silicon powder grains are coated with the highly viscous lubricant. Thereafter, the mixture is separated from the media by use of a #10 mesh screen. The resulting milled mixture must have no particle of a size greater than 35 microns. If any of the particles in the milled mixture are greater than 35 microns, the deleterious effects indicated earlier would ensue. Such effects include: (a) insufficient nitriding of all particles leaving free silicon which leads to flaws in the final product and thus decreases strength, (b) local concentrations of $Y_2O_3$, $Al_2O_3$, or silicon may appear, causing strength variations in the final product.

The oxygen level after milling in air will generally be increased to about 1.6 weight percent of the silicon and be present as an oxide coating on the silicon in an amount of about 3 weight percent. The oxide coating will in subsequent processing react with both $Al_2O_3$ and $Y_2O_3$ to form aluminum rich silicates and silicon oxynitrides.

3. Cold Compaction

A measured quantity of the milled mixture is dry formed that is, it is loaded into a cold pressed die arrangement and pressed at ambient conditions by use of 1400–1500 psi to form a cylindrical compact of a size about 6" in diameter and about 0.6" thickness and a density of about 1.4 gm/cm$^3$. The pressure of compaction should be sufficient to provide a green density of at least 1.4 gm/cm$^3$ (42% of final theoretical density in the compact).

4. Heating to Nitride

The compact is then heated in a nitriding atmosphere, without the use of pressure normally associated with hot pressing, to produce a silicon nitride comprising body consisting of silicon nitride, at least one dispersed second phase crystallite (silicon oxynitride), 0.2–1% silicate (by weight of the body), and up to 0.5% by weight of free silicon and unreacted oxygen carrying agents (here $Y_2O_3$ and $Al_2O_3$). The body will have a size greater than and a density less than the object to be formed. For further details on nitriding see the disclosure of copending U.S. Ser. No. 444,251, the disclosure of which is incorporated herein by reference.

5. Hot Pressing

The nitrided body is then hot pressed to produce a silicon nitride comprising object of required dimension and density. A pressing fixture having graphite walls is typically used to carry out the hot pressing. The walls and nitrided body are both coated with a slurry of boron nitride and dried. The details of effective hot pressing are further set forth in copending U.S. Ser. No. 444,246.

The resulting product will have a strength (modulus of rupture) in a four-point bend test of 110–120 psi, as compared to 80–100 psi for material prepared according to the prior art. The coalesced particles in the product will have a Weibull slope for variation of strength data which is 10–18, as opposed to 7–12 for the prior art; this shows greater uniformity. The hardness will be increased to 91 (45-N scale), as opposed to 89–90 for the prior art.

We claim:

1. A method of making a compacted body useful in the fabrication of an improved, fully densified silicon nitride, ceramic body, comprising:

(a) mixing only a powder supply of silicon and oxygen carrying agents with an effective small amount of a dry lubricant having a low surface energy value less than 28 dyne/cm, and which is characterized by a glass transition temperature of −43° to −82° C. and a molecular weight greater than zero but less than 5000;

(b) dry milling said mixture for a sufficient period of time to ensure that no particle in said mixture is greater in size than 35 microns; and (c) dry forming a compact of said dry milled mixture with pressure sufficient to provide a green density for handling.

2. The method as in claim 1, in which said dry milling lubricant is selected from the group consisting of polybutylacrylate, poly 2-ethylhexylacrylate, and polyisobutylacrylate.

3. The method as in claim 1, in which said effective small amount of dry milling lubricant is in the range of 0.001–0.006% by weight of the mixture.

4. The method as in claim 1, in which the supply of silicon powder has a purity of 97% or greater, a carbon equivalent of greater than 0.05%, and a starting average particle size as great as 10–60 microns.

5. The method as in claim 1, in which said dry milling lubricant is added in an amount effective to avoid packing of said powder mixture along the sides of the milling chamber during the milling operation, thereby permitting said milling to reduce all particles to the desired size of no greater than 35 microns within a milling period equal to or less than 48 hours.

6. The method as in claim 1, in which said supply of oxygen carrying agents is selected from the group consisting of $Y_2O_3$, $Al_2O_3$, and $SiO_2$, the purity of said oxygen carrying agents is characterized by at least 99.99% for said $Y_2O_3$ and at least 99.5% for said $Al_2O_3$.

7. The method as in claim 1, in which said physical characteristics of the dry lubricant and the amount of dry lubricant utilized provide an ultrathin, viscous lubricant wetting the other ingredients of said mixture.

* * * * *